US012140272B2

(12) United States Patent
Byl et al.

(10) Patent No.: US 12,140,272 B2
(45) Date of Patent: Nov. 12, 2024

(54) SYSTEMS AND METHODS FOR STORING MOLECULAR DIBORANE

(71) Applicant: ENTEGRIS, INC., Billerica, MA (US)

(72) Inventors: Oleg Byl, Southbury, CT (US); John Robert Morris, Blacksburg, VA (US); Nathan Ballard Jones, Blacksburg, VA (US); Diego Troya, Blacksburg, VA (US)

(73) Assignee: ENTEGRIS, INC., Billerica, MA (US)

( * ) Notice: Subject to any disclaimer, the term of this patent is extended or adjusted under 35 U.S.C. 154(b) by 30 days.

(21) Appl. No.: 18/102,259

(22) Filed: Jan. 27, 2023

(65) Prior Publication Data
US 2023/0235856 A1   Jul. 27, 2023

Related U.S. Application Data

(60) Provisional application No. 63/303,955, filed on Jan. 27, 2022.

(51) Int. Cl.
| | |
|---|---|
| *F17C 11/00* | (2006.01) |
| *B01J 20/20* | (2006.01) |
| *C01B 6/10* | (2006.01) |
| *C01B 32/20* | (2017.01) |
| *F17C 5/00* | (2006.01) |

(52) U.S. Cl.
CPC .............. *F17C 11/00* (2013.01); *B01J 20/20* (2013.01); *C01B 6/10* (2013.01); *C01B 32/20* (2017.08); *F17C 5/00* (2013.01); *C01P 2002/78* (2013.01); *F17C 2205/0323* (2013.01); *F17C 2221/01* (2013.01); *F17C 2270/0518* (2013.01)

(58) Field of Classification Search
CPC ........ F17C 5/00; F17C 11/00; F17C 2221/01; F17C 2270/0518; C01B 6/10; C01B 32/20
See application file for complete search history.

(56) References Cited

U.S. PATENT DOCUMENTS

| | | | |
|---|---|---|---|
| 3,928,293 A | 12/1975 | Crosby | |
| 4,223,173 A | 9/1980 | Manziek | |
| 5,993,776 A | 11/1999 | Pasqualini et al. | |
| 10,940,426 B2 * | 3/2021 | Tom | B01D 53/02 |
| 2009/0188392 A1 | 7/2009 | Carruthers | |
| 2020/0206717 A1 * | 7/2020 | Dubois | B01J 20/16 |

FOREIGN PATENT DOCUMENTS

WO   2014088797 A1   6/2014

OTHER PUBLICATIONS

Park et al., CO2 adsorption characteristics of slit-pore shaped activated carbon prepared from cokes with high crystallinity, Carbon letters, Korean Carbon Society, vol. 16, No. 1, pp. 45-50, 2015.

* cited by examiner

*Primary Examiner* — Timothy L Maust

(57) ABSTRACT

Described are systems and methods of storing adsorbing diborane on carbon adsorption medium. The invention discloses a vessel for storing diborane. The vessel includes: a vessel interior; microporous carbon adsorbent in the vessel interior; diborane in the vessel interior at least partially adsorbed on the microporous adsorbent. The microporous adsorbent includes slit pores between graphite layers at a graphite layer spacing that increases an activation energy required for diborane degradation relative to an activation energy of degradation of non-adsorbed gaseous diborane at ambient pressure, and at the same temperature.

12 Claims, 3 Drawing Sheets

SYSTEMS AND METHODS FOR STORING MOLECULAR DIBORANE

FIELD

The following description is in a field of adsorption media and methods of adsorbing diborane onto an adsorption medium for adsorbed storage.

BACKGROUND

Diborane ($B_2H_6$) is commonly used as a source gas (or "reagent gas") in industrial processes, for example in manufacturing semiconductor and microelectronic devices. In one specific example, diborane is used as a raw material in chemical vapor deposition (CVD) processes such as the growth of doped silicon thin layers or conformal boron-nitride coatings. Diborane is also used in ion implantation applications.

Diborane is supplied to a process as a reagent gas in a useful gaseous form and must contain a very low level of contaminants. Typically, diborane is dispensed from a storage vessel that contains the diborane in a chemical form that can be reliably dispensed from the vessel.

One manner of storing diborane is in a pressurized vessel such as a pressurized cylinder. The diborane may be stored in a pure form at a very high concentration, such as a concentration that approaches one-hundred percent diborane, and delivered in that pure form. But a challenge with these systems is that concentrated diborane is highly unstable at room temperature, and degrades chemically into a reactive $BH_3$ compound that further reacts to form hydrogen ($H_2$) and a more stable, higher order borane compound such as $B_4H_{10}$, $B_5H_9$, or $B_{10}H_{14}$. Pure diborane held under pressure decomposes quickly, within a matter of days or weeks, to a substantially lower concentration.

To improve stability, diborane can be stored at a diluted concentration, mixed with an inert gas such as gaseous hydrogen ($H_2$), nitrogen ($N_2$), or argon, etc., at a concentration of up to 30 percent diborane, but typically in a range from 1 to 10 percent diborane. Storing diborane in a mixture with an inert gas reduces the rate of decomposition of the diborane, which decomposes at a rate that is inverse to the concentration of diborane in the mixture. A reduced concentration of the diborane in a mixture reduces the rate of diborane decomposition. Still, these mixtures can have shelf-lives that are as short as 6 or 12 months, which limits their value.

To further improve diborane stability, the temperature of a stored mixture of diborane and inert gas can be reduced. Refrigeration, however, adds significant complication and expense to steps of transporting, storing, and dispensing the stored diborane. To best improve stability, the diborane and inert gas must be charged into the pressurized cylinder, then transported, stored, and eventually connected to a processing tool, all while refrigerated. The cylinder must be refrigerated during an entire time from manufacture to use, including while the cylinder is connected to a processing tool to supply the diborane to the processing tool.

As an alternate means to store and deliver reagent gases, certain reagent gases may be adsorbed onto a solid adsorption medium held within in a storage vessel, optionally under pressure, and selectively desorbed for delivery from the vessel. Desorption and delivery of the reagent gas from the storage vessel may involve application of a reduced pressure, application of thermal energy, or both.

Methods of storing diborane using solid adsorbent have been considered (see, U.S. Pat. Nos. 3,928,293, 4,223,173, 5,993,776, 10,940,426), usually based on reactive adsorption of $BH_3$ species on Lewis base sites.

Even with strong commercial interest in an adsorbent-type one-hundred-percent diborane gas storage and delivery product, a successful commercial product has not been developed. Low-temperature storage of diborane is perhaps the most viable solution, but low temperature storage has not been wall-adopted commercially by users due to complexities and cost associated with prolonged storage at very low temperatures.

It would be highly desirable to identify adsorption media that are effective to adsorb diborane in a reversible (desorbable) manner for storing diborane in a chemically-stable condition, preferably with good stability of the diborane during storage.

SUMMARY

Figure 1A:
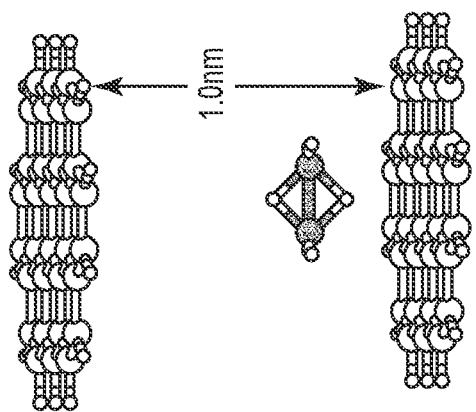
FIGS. 1A, 1B, and 1C illustrate a diborane molecule in a storage condition.

The following description relates to systems and methods for reversibly storing diborane on adsorbent.

In one aspect, the present description relates to a vessel for storing diborane. The vessel includes: a vessel interior; microporous carbon adsorbent in the vessel interior; diborane in the vessel interior at least partially adsorbed on the microporous adsorbent. The microporous adsorbent includes slit pores between graphite layers at a graphite layer spacing that increases an activation energy required for diborane degradation relative to an activation energy of degradation of non-adsorbed gaseous diborane at ambient pressure, and at the same temperature.

In another aspect, the invention relates to a method of reversibly storing diborane on adsorbent, in a vessel. The method includes: to a storage vessel comprising microporous carbon adsorbent that comprises slit pores between graphite layers that have a graphite layer spacing that increases an activation energy required for diborane degradation relative to an activation energy of degradation of non-adsorbed gaseous diborane, adding to the vessel diborane gas, the diborane becoming adsorbed onto the microporous carbon adsorbent, and storing the adsorbed diborane in the vessel.

DETAILED DESCRIPTION

Described as follows are systems, products, and methods useful to reversibly store adsorbed diborane using carbon adsorbent Diborane is a chemical compound that consists of two boron atoms and six hydrogen atoms, having the chemical formula $B_2H_6$. Diborane is used as a reagent gas in the semiconductor industry as a feed material in boron doping applications and as a reducing agent in tungsten deposition, for example.

According to this description, diborane can be stored by being adsorbed at a surface (specifically, at a pore of the surface) of carbon adsorbent that is contained within a storage vessel. The storage vessel contains the activated carbon, adsorbed diborane, and normally an amount of gaseous diborane in equilibrium with the adsorbed diborane; i.e., the vessel contains an adsorbed phase of the diborane in equilibrium with a gaseous phase of the diborane. The adsorbed diborane is reversibly adsorbed at the adsorbent surface and can be stored in the vessel in this adsorbed state for a period of time, and selectively desorbed from the surface in a controlled manner for dispensing from the storage vessel. The desorbed diborane may be delivered from the storage vessel for use as a gaseous raw material, preferably with a low level of contaminants, for an industrial process such as for semiconductor or microelectronic device manufacturing.

The diborane can be stored in a concentrated form, meaning that the storage vessel contains the activated carbon adsorbent, diborane in an adsorbed phase and a gaseous phase, and not more than a minor amount of any other gaseous or adsorbed chemical such as an inert gas to stabilize the diborane. The diborane may optionally be stored in combination with an inert gas such as argon, nitrogen, or hydrogen, but an inert gas is not required to stabilize the stored diborane and may be excluded from the vessel. In useful or preferred systems, the vessel contains at least 60 percent, 70, 80, 90, 95, 99, or 99.9 percent (atomic) diborane based on total contents of gaseous and adsorbed species. The vessel can contain less than 40, 30, 20, 5, 1, or 0.1 percent (atomic) of non-borane chemical species in a gaseous or adsorbed phase (excluding the carbon adsorbent).

The diborane is adsorbed in a vessel at a surface of an carbon adsorbent, which includes activated carbon adsorbent. The term "carbon adsorbent" refers to a range of carbon-based materials that are derived synthetically from carbon-containing polymeric materials or from carbon-based materials having a natural source. Examples include: carbon formed by pyrolysis of synthetic hydrocarbon resins such as polyacrylonitrile, sulfonated polystryrene-divinyl-benzene, polyvinylidene chloride, etc.; cellulosic char; charcoal; and activated carbon formed from natural source materials such as coconut shells, pitch, wood, petroleum, coal; nanoporous carbon, etc.

Carbon adsorbents that can be particularly useful in a described method or storage system can be those that are have a high purity and that contain a low amount of chemical defects on graphite layers of the adsorbent. These carbon adsorbents have a low concentration chemical functionalities attached to the graphite sheets, a low amount of missing carbon atoms and unsaturated carbon atoms, a low amount of metal impurities, a low amount of closed pore, and a low amount of non-parallel graphite layers that produce wedge-shape pores.

Carbon adsorbents are known to be highly porous adsorptive materials that have a complex chemical makeup of primarily carbon atoms. Activated carbon adsorbents can be in the form of a solid material that include a networks of pores that are present within a rigid matrix of layers of carbon atoms, i.e., layers of "graphite," that are stacked and linked together by chemical bonds to create a highly porous structure of inter-connected openings or channels, referred to as "pores," between the graphite layers.

Non-limiting examples of useful carbon adsorbents include: carbon-based adsorbent formed by pyrolysis of synthetic polymer such as a hydrocarbon, halocarbon (e.g., chlorocarbons), or hydrohalocarbon resin e.g., polyacrylonitrile, polystyrene, sulfonated polystryrene-divinylbenzene, polyvinylidene chloride (PVDC), etc.; polymer framework (PF) materials; porous organic polymers (POP); cellulosic char; charcoal; and activated carbon formed from natural source materials such as coconut shells, pitch, wood, petroleum, coal, etc.

Carbon adsorbent may have any suitable form, such as a form of granules (also referred to as "particles"). Granules are individual pieces of activated carbon adsorbent, each piece having a relatively small size, such as less than 2 centimeters, or less than 1 or 0.5 centimeter. The particles may have any useful particle size, shape, and range of particle sizes. Examples shapes include beads, granules, pellets, tablets, shells, saddles, powders, irregularly-shaped particulates, extrudates of any shape and size, cloth or web form materials, honeycomb matrix monolith, and composites (of the adsorbent with other components), as well as comminuted or crushed forms of the foregoing types of adsorbent materials.

Useful or preferred carbon adsorbent particles can have an average size that is in a range from 0.5 to 20 millimeters, such as from 1 to 15 or from 1 to 10 millimeters (mm). Average particle size for a collection of adsorbent particles can be measured by standard techniques, including random selection of particles from a collection of particles and measuring size (e.g., diameter) by use of a micrometer.

Carbon adsorbent (e.g., in the form of particles or as a monolith) can be characterized by surface area of the adsorbent. A surface area measurement can be performed by known methods, such as by applying a BET analysis of nitrogen adsorption isotherm. According to useful or preferred examples, an activated carbon adsorbent material can exhibit a relatively high surface area, such as a surface area of at least 500, 600, or 700 square meters per gram, e.g., a surface area in a range from 700 to 1000 square meters per gram, or higher.

Another property of a carbon adsorbent is porosity (also sometimes referred to as "pore volume"), which is a volume within the activated carbon adsorbent that is taken up by pores, per mass of the adsorbent. Example activated carbon adsorbent particles can have a porosity of at least 0.2 milliliters per gram, such as a porosity of at least 0.5 milliliters per gram, preferably at least 0.8 milliliters per gram.

The carbon adsorbent is porous, containing an interconnected network of pores that extend from surfaces into the interiors of adsorbent particles. Pore sizes of adsorbent materials are classified in general ranges based on average pore sizes of a collection of adsorbent particles. Activated carbon adsorbents that have an average pore size of greater than 50 nanometers (nm) are typically referred to as macroporous. Activated carbon adsorbents that have an average pore size in a range from 2 to 50 nanometers (nm) are typically referred to as mesoporous particles. Carbon adsorbents that have an average pore size of less than 2 nanometers are typically referred to as microporous. These terms are defined by IUPAC terminology.

A carbon adsorbent may have pores in a macroporous range, pores in a mesoporous range, and pores in a microporous range. Desirably, for useful adsorption of diborane as described, the adsorbent can have a useful amount of pores of a microporous range. In particular, storage methods and systems as described have been found to be effective using carbon-based adsorbent that contains pores that are referred to as "slit-pores," and that also have a size that results in improved chemical stability of diborane that the Applicant has identified, that is associated with an energy level of the diborane molecules contained in slit-pores of a certain size range.

Carbon adsorbents are considered to have pores of a form that is referred to as "slit-pores." In an activated carbon adsorbent, the solid adsorbent material on a molecular scale includes parallel sheets of graphite. Spaces or openings that are present between adjacent graphite sheets are the "pores" of the adsorbent that serve as space for storing chemical molecules in an "adsorbed" state. These pores can be characterized by the distance or "spacing" of adjacent graphite layers, which is one of three size dimensions of the three-dimensional pores of the adsorbent.

As determined by the Applicant, the chemical stability of diborane that is stored in an adsorbed condition, in a slit-pore of carbon adsorbent, is affected by the spacing of layers of graphite that form the pore, the value of that spacing being referred to as the "graphite layer spacing" of a slit-pore. Stability and the rate of chemical degradation of a stored diborane molecule will be greater or will be decrease based on the size of the slit-pore measured by the distance between adjacent graphite layers that form the slit-pore. As determined by the Applicant, diborane molecules that are stored in slit-pores that have a graphite layer spacing that is less than 0.8 nanometers, preferably that is less than 0.7 nanometers, have improved stability, i.e., experience reduced chemical degradation compared to diborane molecules that are stored in slit-pores having a graphite layer spacing that is greater than 0.8 nanometers.

In more detail, the chemical breakdown of diborane occurs by a series of multiple reactions by which diborane molecules react to a form a different borane compound, such as $B_3H_9$, $B_4H_{10}$, $B_5H_9$, or $B_{10}H_{14}$. By an initial reaction, diborane ($B_2H_6$) dissociates into two reactive borane ($BH_3$) molecules. The borane molecules react with another diborane ($B_2H_6$) molecule to form other reactive intermediates such as $B_3H_9$, and $B_3H_7$ that result in a relatively more stable borane such as $B_4H_{10}$, etc., and $H_2$. E.g.:

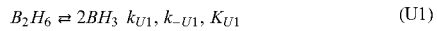

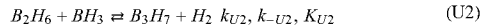

$$\text{Rate expression} = -\frac{d(B_2H_6)}{dt}$$

$$= 2k_{U3}[B_2H_6]\frac{K_{U1}^{1/2}k_{U2}[B_2H_6]^{3/2}}{k_{-U2}[H_2] + k_{U3}[B_2H_6]}$$

Computational Study of the Initial Stage of Diborane Pyrolysis

Baili Sun and Michael L. McKe. Inorg. Chem. 52, 5962(2013).

An improved level of chemical stability of stored diborane is measured as a reduced rate of chemical degradation of the stored diborane, e.g., diborane contained in a pore of an adsorbent, compared to a rate of chemical degradation of non-stored (non-constrained) gaseous diborane. These rates can be for storage and degradation at any temperature, including ambient temperature of from 18 to 25 degrees Celsius, e.g., 21 or 23 degrees Celsius.

A reduced rate of chemical degradation may be achieved by affecting borane molecules in a manner that reduces a rate constant of a forward reaction U1 (diborane dissociation), or U2 ($BH_3$ attack of $B_2H_6$), or both. The rate constant of a reaction, k, is a function of activation energy, $E_a$, and temperature, and it is described by the Arrhenius equation. Therefore, an increase in activation energy leads to decrease in reaction rate or increase in stabilization.

$$k = Ae^{-\frac{E_a}{RT}}$$

Based on the following, show that diborane can be stabilized, i.e., chemical degradation of diborane can be reduced, by storing diborane molecules in an adsorbent with slit-pores that have a graphite layer spacing separation below 0.7 or 0.8 nanometers.

Figure 1B:
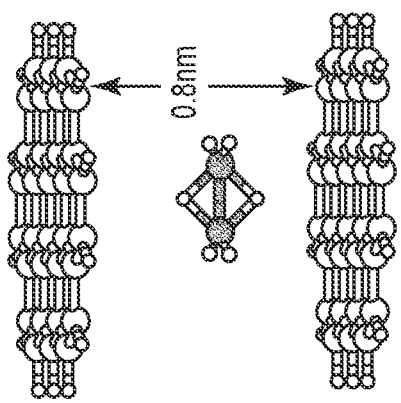
Figure 1C:
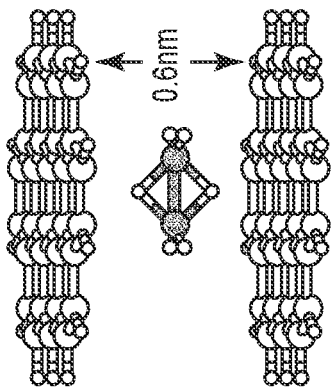

Referring to FIGS. 1A, 1B, and 1C, these figures illustrate a diborane molecule held within a slit-pore of an adsorbent, e.g., activated carbon adsorbent. FIGS. 1A, 1B, and 1C each show a diborane molecule contained in a slit-pore having a graphite layer spacing of 1.0, 0.8, and 0.6 nanometers, respectively. FIG. 1A shows a graphite layer spacing of 1.0 nanometer, which is also an approximation of a condition of gaseous diborane that is unconstrained by any pore space of an adsorbent.

As the size of a slit-pore is reduced, e.g., as the spacings of graphite layers of adsorbent become more closely spaced, the activation energy required for diborane to decompose into borane ($BH_3$) drops sharply. See FIG. 2A. But as slit-pore size is reduced and the activation energy for diborane degradation to borane is reduced, the activation energy for the reaction of borane ($BH_3$) with diborane ($B_2H_6$) increase even more substantially to a larger degree. See FIG. 2B. As shown at FIG. 2C, the combined effect of the reduced activation energy for diborane degradation to borane and the increased activation energy for the reaction of borane ($BH_3$) with diborane ($B_2H_6$) is a significant increase in net activation energy at about 0.7 and 0.8 nanometers graphite layer spacing, for diborane to chemically degrade to $B_3H_7$ and subsequently to any higher order borane compound such as $B_4H_{10}$, $B_5H_9$, $B_{10}H_{14}$, etc.

The chemical degradation of diborane includes multiple reaction paths and reaction products that include various higher-order diboranes. One example of a reaction route produces $B_3H_9$. According to methods and systems as described, carbon adsorbent used to store adsorbed diborane can be selected to have slit pores with graphite layer spacing that increase an activation energy required for chemical degradation of diborane that is adsorbed in the slit-pores, at a given temperature, compared to an activation energy of degradation of non-adsorbed gaseous diborane at the same temperature. The activation energy to produce the $B_3H_9$ is calculated as a total of: one-half the activation energy of reaction (i), plus the activation energy of reaction (ii):

Figure 2A:
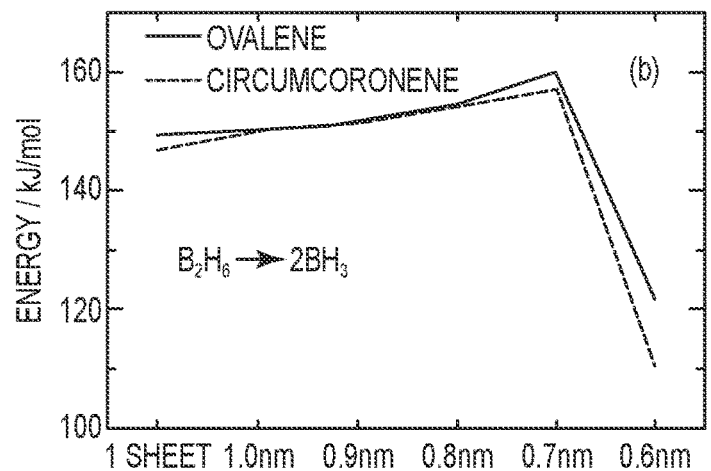
FIGS. 2A, 2B, and 2C shows activation energies of reactions involved in chemical degradation of diborane.
Figure 2B:
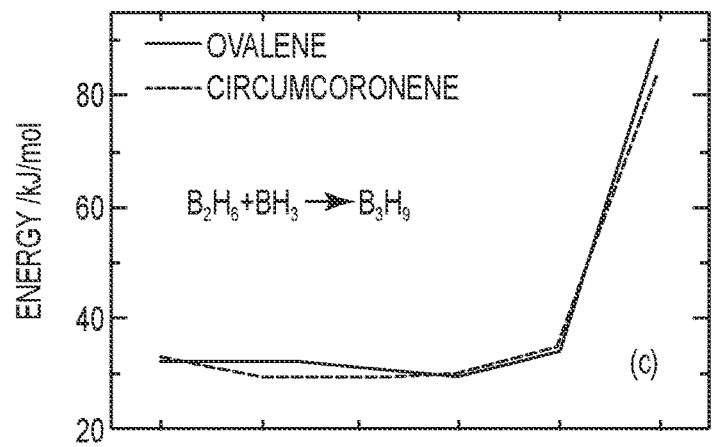
Figure 2C:
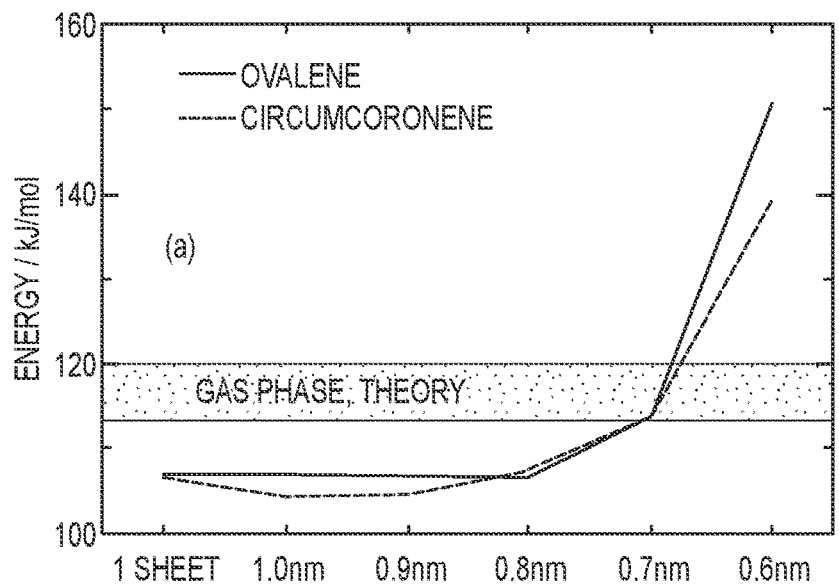
Figure 3:
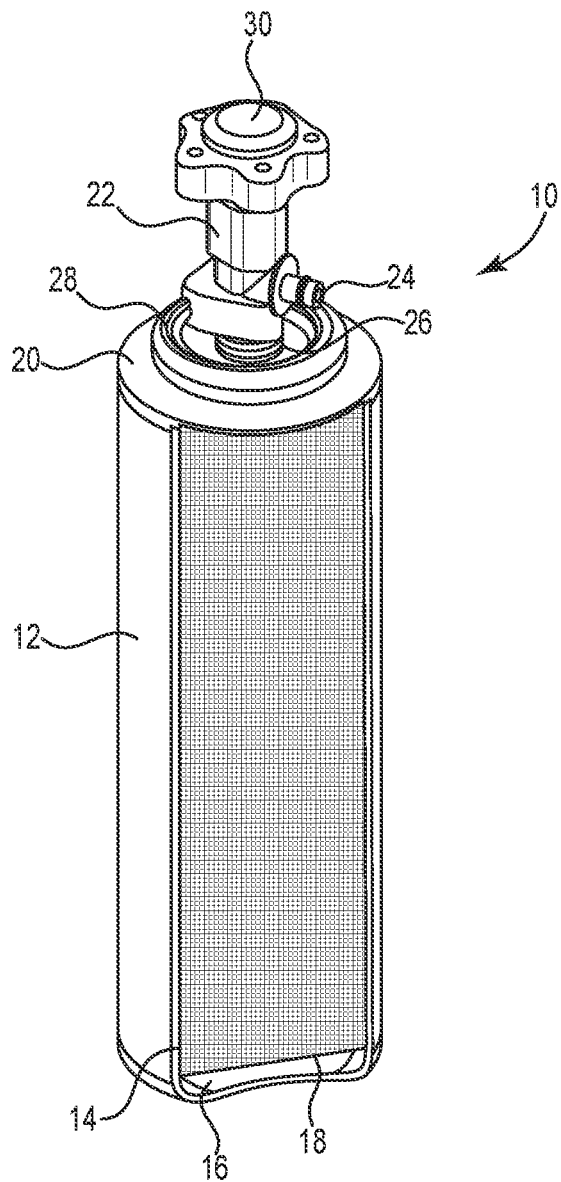
FIG. 3 shows an example storage and delivery vessel as described.

FIGS. 2A, 2B, and 2C show data at a graphite layer spacing of 1.0 nanometer, and at a "1 sheet" designation; the measurement at "1 sheet" represents an activation energy of degradation of non-adsorbed gaseous diborane. The graphs at FIGS. 2A, 2B, and 2C show ovalene simulation pores at specific separations between ovalene sheets. $B_{97}D$/def2-TZVP/w06 with frozen surfaces level of theory was used for this simulation.

A lower practical limit for a graphite layer spacings may be about 3.4 angstroms. A preferred graphite-layer spacing, therefore, for adsorbent for storing and stabilizing diborane may be in a range from 0.34 to 8.0 angstroms, such as from 4.0, 5.0, or 6.0 angstroms to 7.0, 7.5, or 8.0 angstroms. Useful or preferred adsorbents, e.g., carbon adsorbent, can have a useful or high relative amount of pores with a graphite layer spacing in this range, e.g., may contain a total amount of pores that includes at least 50, 60, 70, or 80 percent of pores that are slit pores having a graphite layer spacing in a range from 0.34 to 8.0 angstroms, such as from 4.0 to 8.0 angstroms, or from 5.0 to 8.0 angstroms, or from 5.0, 5.5, or 6.0 angstroms to 7.0, 7.5, or 8.0 angstroms.

As used herein, graphite-layer spacing can be determined through measuring adsorption isotherms with probe molecules such as nitrogen, argon, carbon dioxide, xenon, etc.

The described storage of diborane by reversible adsorption on an adsorbent having size properties as described can be performed in a storage vessel that is of a type known for use in adsorbent-based storage systems and methods. The vessel may be a rigid container with rigid sidewalls, a rigid top and bottom, and an opening at the top to which a valve or other dispensing device can be attached. The bottom can be generally flat and the top may be flat, curved, rounded, domed, or elongated. The sidewalls, bottom, and a top are made of a rigid material such as a metal (carbon steel, stainless steel, aluminum), fiberglass, or rigid polymer. For storing a adsorbed diborane at a low pressure within the vessel, the vessel is not required to be adapted to contain contents at high pressure.

The interior surfaces of the cylinder sidewalls, top, and bottom can be finished in any appropriate way to reduce their true surface area arising from non-flat surface morphology at a microscopic level, and treated to render the interior surface clean and non-reactive to ensure high purity of the diborane when dispensed from the vessel after a storage period. Examples of such finishing and treatment include abrasive blasting, polishing, grinding, sanding, electropolishing, electroplating, electroless plating, coating, galvanizing, anodizing, etc.

The "valve" may be any dispensing device that can be selectively opened and closed to allow flow of gaseous diborane between the vessel interior and a vessel exterior. A valve may be of any type, such as a diaphragm valve. Associated with the valve either internal or external to the vessel may be various flow control devices such as a filter, pressure regulator, pressure gauge, flow regulator, etc.

FIG. 1 shows an example of a fluid supply system ("fluid supply package") as described, in which adsorbent (e.g., activate carbon adsorbent) is placed for use to adsorb, store, and dispense (upon desorption) diborane.

As illustrated, fluid supply package 10 comprises vessel 12 that includes a cylindrical wall 14 and floor enclosing an interior volume 16 of vessel 12 in which is disposed adsorbent 18. Vessel 12 at its upper end portion is joined to cap 20, which may be of planar character on its outer peripheral portion, circumscribing upwardly extending boss 28 on the upper surface thereof. Cap 20 has a central threaded opening receiving a correspondingly threaded lower portion 26 of a fluid dispensing assembly.

Valve head 22 that is movable between open and closed positions by any suitable action such as manually operated hand wheel or pneumatically operated activator 30 coupled therewith. The fluid dispensing system includes an outlet port 24 for dispensing gaseous diborane from the fluid supply system when the valve is opened by operation of the hand wheel 30.

Adsorbent 18 in the interior volume 16 of vessel 12 may be of any suitable type as herein disclosed, and may for example comprise adsorbent in a powder, particulate, pellet, bead, monolith, tablet, or other appropriate form of activated carbon. The adsorbent has sorptive affinity for diborane, to allow for adsorptive storage of and selective dispensing of the diborane relative to the vessel interior. Dispensing may be performed by opening valve head 22 to accommodate desorption of diborane that is stored in an adsorbed form on the adsorbent, and discharge of gaseous diborane from the vessel through the fluid dispensing assembly to the outlet port 24 and associated flow circuitry (not shown), wherein the pressure at the outlet port 24 causes pressure-mediated desorption and discharge of diborane from the fluid supply package interior. For example, the dispensing assembly may be coupled to flow circuitry that is at lower pressure compared to pressure at the vessel interior, for such pressure-mediated desorption and dispensing, e.g., a sub-atmospheric pressure appropriate to a downstream tool coupled to the fluid supply package by the flow circuitry. Optionally, dispensing may include opening valve head 22 in connection with heating of the adsorbent 18 to cause thermally-mediated desorption of diborane for discharge from the fluid supply package.

The fluid supply package 10 may be charged with diborane for storage on the adsorbent by an initial evacuation of fluid from the interior volume 16 of vessel 12, followed by flow of diborane into the vessel through outlet port 24, which thereby serves a dual function of charging as well as dispensing of gaseous diborane from the fluid supply package. Alternatively, valve head 22 may be provided with a separate fluid introduction port for charging the vessel and loading adsorbent with the introduced fluid.

Diborane in the vessel may be stored at any suitable pressure condition, preferably at sub-atmospheric pressure (below 760 torr) or low sub-atmospheric pressure (below 100 torr or below 50 or 30 torr), thereby enhancing the safety of the fluid supply package in relation to fluid supply packages such as high pressure gas cylinders.

The invention claimed is:

1. A vessel for storing diborane, the vessel comprising:
a vessel interior,
microporous carbon adsorbent in the vessel interior,
diborane in the vessel interior at least partially adsorbed on the microporous adsorbent, and
the microporous adsorbent comprises slit pores between graphite layers at a graphite layer spacing that increases an activation energy required for diborane degradation relative to an activation energy of degradation of non-adsorbed gaseous diborane at ambient pressure, and
wherein the activation energy is a total of: one-half the activation energy of reaction (i), plus the activation energy of reaction (ii):

$$B_2H_6 \rightarrow 2BH_3 \tag{i},$$

$$B_2H_6 + BH_3 \rightarrow B_3H_9. \tag{ii}$$

2. The vessel of claim 1, comprising diborane at a concentration of at least 50 percent (atomic) based on a total amount of adsorbed and gaseous chemical species in the vessel interior.

3. The vessel of claim 1, wherein the graphite sheets have a graphite layer spacing equal to or less than 0.8 nanometers.

4. The vessel of claim 1, wherein at least 50 percent of pores of the adsorbent have a graphite layer spacing in a range from 0.4 to 0.8 nanometers.

5. The vessel of claim 1, wherein at least 80 percent of pores of the adsorbent have a graphite layer spacing in a range from 0.4 to 0.8 nanometers.

6. The vessel of claim 1, wherein at least 80 percent of pores of the adsorbent have a graphite layer spacing in a range from 0.4 to 0.7 nanometers.

7. The vessel of claim 4, wherein the stored gaseous molecular diborane exhibits a reduced rate of degradation during storage at 22 degrees Celsius, compared to diborane stored on microporous carbon adsorbent having a lower percentage of pores that have a graphite layer spacing in a range from 0.4 to 0.8 nanometers.

8. The vessel of claim 5, wherein the stored gaseous molecular diborane exhibits a reduced rate of degradation during storage at 22 degrees Celsius, compared to diborane stored on microporous carbon adsorbent having a lower percentage of pores that have a graphite layer spacing in a range from 0.4 to 0.8 nanometers.

9. The vessel of claim 6, wherein the stored gaseous molecular diborane exhibits a reduced rate of degradation during storage at 22 degrees Celsius, compared to diborane stored on microporous carbon adsorbent having a lower percentage of pores that have a graphite layer spacing in a range from 0.4 to 0.7 nanometers.

10. A method of reversibly storing diborane in a vessel, the method comprising:
   to a storage vessel comprising microporous carbon adsorbent that comprises slit pores between graphite sheets that have a graphite layer spacing that increases an activation energy required for diborane degradation relative to an activation energy of degradation of non-adsorbed gaseous diborane,
   adding to the vessel diborane gas, the diborane becoming adsorbed onto the microporous carbon adsorbent, and
   storing the adsorbed diborane in the vessel, and
   wherein the activation energy is the total of: one-half the activation energy of reaction (i), plus the activation energy of reaction (ii):

$$B_2H_6 \rightarrow 2BH_3, \tag{i}$$

$$B_2H_6 + BH_3 \rightarrow B_3H_9. \tag{ii}$$

11. The method of claim 10, wherein the vessel contains diborane at a concentration of at least 50 percent (atomic) based on a total amount of adsorbed and gaseous chemical species in the vessel interior.

12. The method of claim 10, wherein the stored diborane experiences reduced degradation during storage compared to an amount of degradation of gaseous molecular diborane stored on microporous carbon adsorbent having a lower percentage of pores that have a graphite layer spacing in a range from 0.4 to 0.8 nanometers.

* * * * *